UNITED STATES PATENT OFFICE.

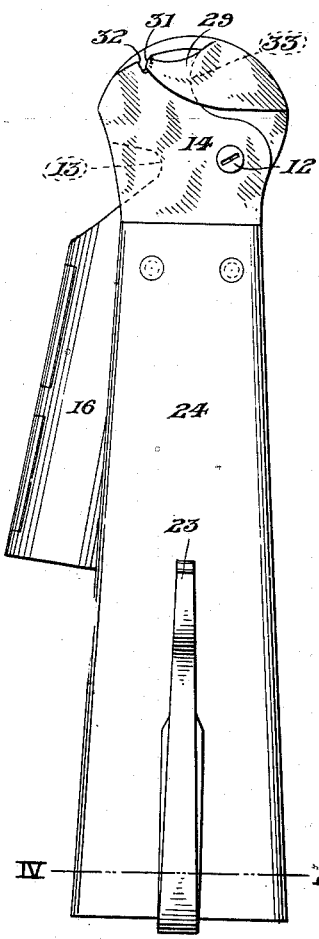
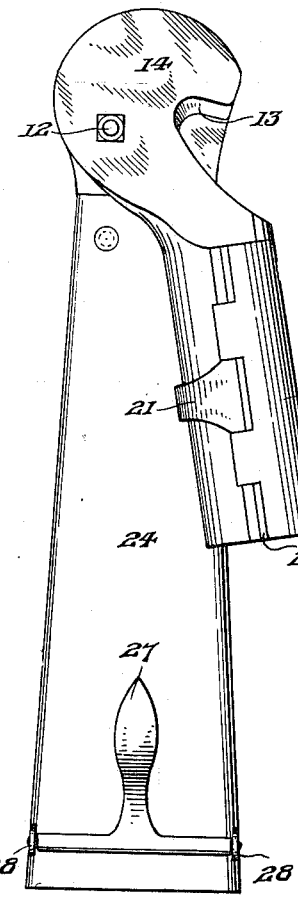
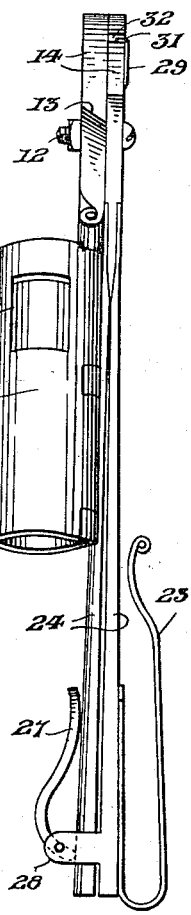
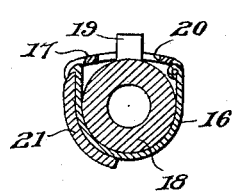
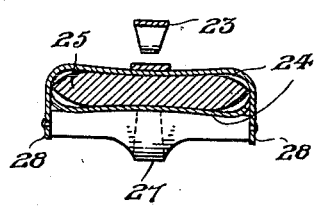

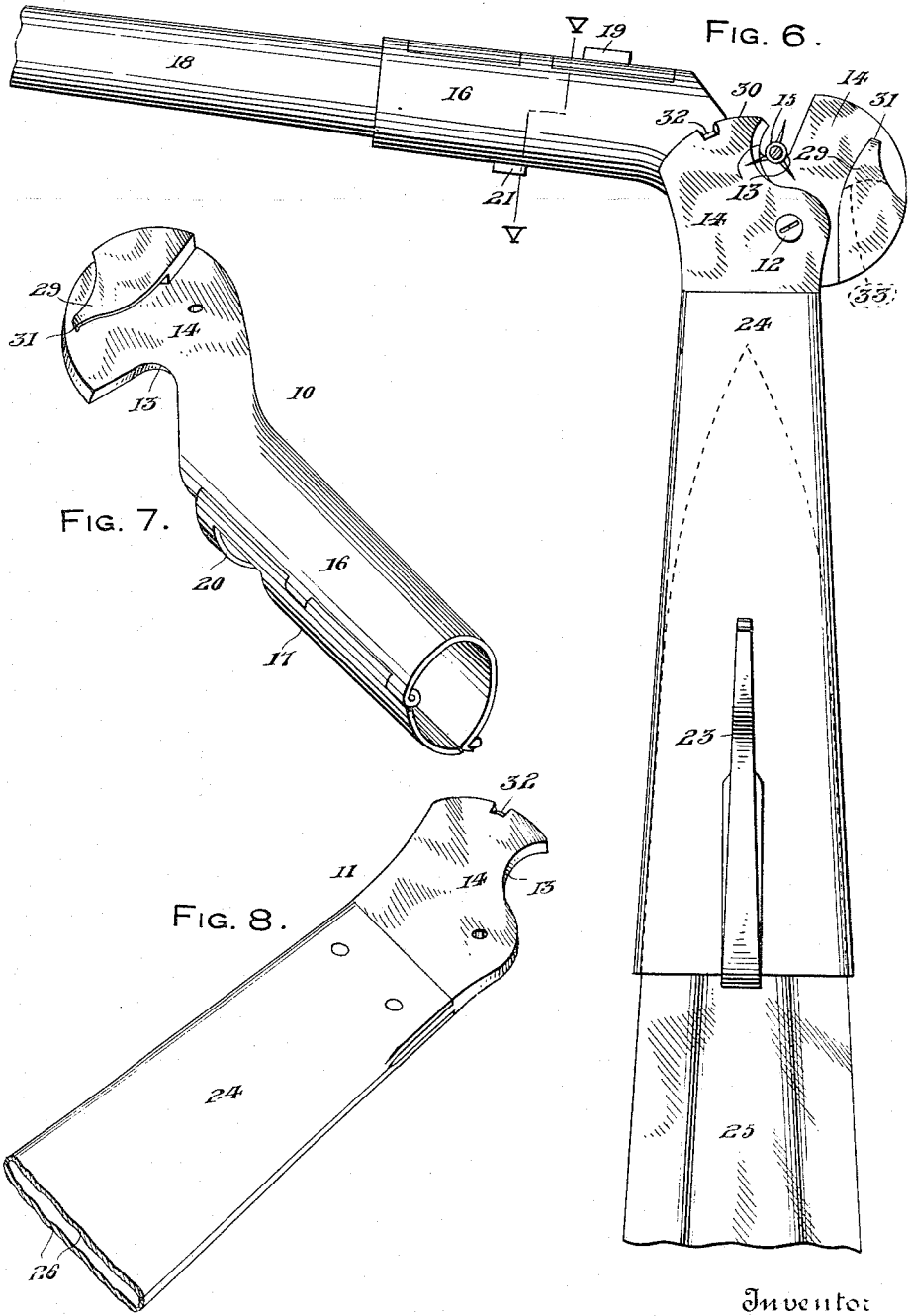

JOSEPH KOWNACZKI, OF TAMAROA, ILLINOIS.

WIRE-CUTTER.

1,276,080.

Specification of Letters Patent.　　Patented Aug. 20, 1918.

Application filed June 4, 1918. Serial No. 238,185.

*To all whom it may concern:*

Be it known that I, JOSEPH KOWNACZKI, a citizen of Russia, residing at Tamaroa, in the count of Perry and State of Illinois, have invented certain new and useful Improvements in Wire-Cutters, of which the following is a specification.

The primary object of the invention is the provision of a wire cutter that may be readily carried attached to the belt of a soldier and easily and quickly mounted in its operative position upon a bayonet for use in cutting the wires of barriers and any other articles desired.

A further object of the invention is to provide a wire cutter of small dimensions and possessing great strength which is readily secured for operation upon the muzzle portion of a rifle and the pointed end of a bayonet whereby the rifle and bayonet form serviceable handles for operating the device to cut wires, these handle members always being conveniently at hand for use whenever desired.

A still further object of the invention is the provision of wire cutting shears adapted to remain closed for convenient carrying upon the belt of a soldier and ready for quick and secure attachment to the free ends of a bayonet and a rifle barrel whereby entanglements may be quickly severed permitting the soldier to travel therethrough.

In the drawings:

Figure 1 is an elevational view of one side of the device detached;

Fig. 2 is a similar view of the opposite side thereof.

Fig. 3 is an elevational view of one edge of the device;

Fig. 4 is a transverse sectional view taken upon line IV—IV of Fig. 1 and an inclosed bayonet attached thereto;

Fig. 5 is a similar sectional view taken upon line V—V of Fig. 6;

Fig. 6 is an elevational view of the device opened and provided with removable handles consisting of a bayonet and a rifle barrel; and Figs. 7 and 8 are perspective views of the cutting members of the device separated.

Referring more in detail to the drawings, two cutting members or sections 10 and 11 are provided pivoted together by a bolt 12 after the manner of a pair of shears whereby the sharpened concaved edges 13 of the jaws 14 of said sections are adapted to coöperate in cutting a wire such as 15, positioned between said edges when the device is opened as illustrated in Fig. 6 of the drawings.

The cutting member 10 has a tubular shank 16 provided with a hinged portion 17 whereby a rifle barrel such as 18 may be slidably positioned within the shank 16 with the sight 19 projecting through an opening 20 in said portion 17. A connecting latch 21 is provided for the portion 17 whereby the shank is tightened and locked upon the barrel in a manner that will be at once apparent from Fig. 5 of the drawings.

A U-shaped spring 23 is provided upon the split shank 24 of the other cutting member 11 adapted for hanging upon the belt of a soldier for convenience in carrying the cutter when not in use. The said shank 24 is adapted to receive the pointed end portion of a bayonet 25 between the opposite sides 26 thereof, while a curved lever 27 journaled in ears 28 of one of said sides 26, is adapted to engage the other side of the shank 24 for drawing said sides together and locking the shank 24 upon the bayonet 25 as illustrated in Fig. 4 of the drawings.

A flat spring 29 upon the jaw 14 of the cutting member 10 is slightly resilient and adapted to wipe over the end 30 of the jaw 14 of the other cutting member 11 when the jaws are completely closed and which occurs subsequent to the wire cutting operation. A downturned finger 31 of the spring 29 seats within a notch 32 in the free end of the jaw 14 of the cutting member 11 whereby the cutting members are yieldingly retained in their normal closed positions against accidental opening when the device is being carried upon the soldier's belt. The cutting edge 13 of the member 11 is positioned beneath the spring 29, when the device is closed, adjacent a correspondingly shaped shoulder 33 provided beneath the said spring and forming a stop for the cutting members.

A serviceable cutter is provided which is light in weight and can easily be carried by a soldier, while its adaptation for ready attachment upon a bayonet and rifle barrel permits the use thereof as handles for operating the cutting members 10 and 11 whenever desired and in a manner which will be evident from the foregoing description of the device.

What I claim as new is:

1. A wire severing device comprising pivoted cutting members, a clamping shank for each member adapted for the locking reception of a bayonet and rifle barrel therein, carrying means for the device provided upon one of said cutting members, and closure retaining means provided upon the other cutting member.

2. A wire cutter comprising pivoted jaws having wire receiving cutting portions, shanks carried by said jaws adapted for the reception of a bayonet and rifle barrel, locking means for said shanks, and a closure retaining spring carried by one of said jaws adapted for resiliently engaging the other jaw when the device is closed, with the cutting edge of the last named jaw protectingly positioned beneath the said retaining spring.

3. In combination with pivoted jaws having concaved sharpened cutting edges, a flattened longitudinally split shank projecting from one of said jaws adapted for receiving a bayonet therein, means adapted for drawing the parts of said shank toward each other for locking the same upon a bayonet, and a contracting tubular shank for the other jaw.

4. In combination with pivoted jaws having concaved sharpened cutting edges, a flattened longitudinally split shank projecting from one of said jaws adapted for receiving a bayonet therein, means adapted for drawing the parts of said shank toward each other for locking the same upon a bayonet, a tubular shank for the other jaw having a clamping portion and adapted for the reception of a rifle barrel, the said shank having an opening adapted to receive the barrel sight therethrough, and means for closing said clamping portion upon a rifle barrel when positioned therein.

5. In combination with pivoted jaws having concaved sharpened cutting edges, a flattened longitudinally split shank projecting from one of said jaws adapted for receiving a bayonet therein, means adapted for drawing the parts of said shank toward each other for locking the same upon a bayonet, a contracting tubular shank for the other jaw, one of said jaws having a notch in the end thereof, a retaining spring upon the other jaw adapted for the resilient reception of the notched jaw therebetween during the closing operation, the said spring having a terminal finger seated within said notch when the jaws are closed, a curved stop shoulder beneath said spring against which the coöperating jaw is adapted to engage when the device is closed, and belt engaging means upon one of said shanks.

6. In combination with pivoted jaws having concaved sharpened cutting edges, a flattened longitudinally split shank projecting from one of said jaws adapted for receiving a bayonet therein, means adapted for drawing the parts of said shank toward each other for locking the same upon a bayonet, a tubular shank for the other jaw having a clamping portion and adapted for the reception of a rifle barrel, the said shank having an opening adapted to receive the barrel sight therethrough, means for closing said clamping portion upon a rifle barrel when positioned therein, one of said jaws having a notch in the end thereof, a retaining spring upon the other jaw adapted for the resilient reception of the notched jaw therebetween during the closing operation, the said spring having a terminal finger seated within said notch when the jaws are closed, a stop shoulder beneath said spring against which the coöperating jaw is adapted to engage when the device is closed, and belt engaging means upon one of said shanks.

In testimony whereof I affix my signature.

JOSEPH KOWNACZKI.